(12) United States Patent
Okamuro et al.

(10) Patent No.: US 6,302,233 B1
(45) Date of Patent: Oct. 16, 2001

(54) STEERING AXLE FOR VEHICULAR HYDRAUSTATIC DRIVE SYSTEM

(75) Inventors: Kenneth James Okamuro; Donald W. Fitch, both of Statesville; Jonathan David Oates, Lincolnton, all of NC (US)

(73) Assignee: Spicer Technologies, Inc., Fort Wayne, IN (US)

( * ) Notice: Subject to any disclaimer, the term of this patent is extended or adjusted under 35 U.S.C. 154(b) by 0 days.

(21) Appl. No.: 09/588,205

(22) Filed: Jun. 6, 2000

(51) Int. Cl.[7] .................................................. B60K 7/00
(52) U.S. Cl. ..................... 180/253; 180/308; 280/93.512
(58) Field of Search .................................. 180/252, 253, 180/305, 307, 308; 280/93.512

(56) References Cited

U.S. PATENT DOCUMENTS

| | | |
|---|---|---|
| 1,934,883 * | 11/1933 | Reader .............................. 280/93.512 |
| 2,353,730 | 7/1944 | Joy . |
| 2,768,843 | 10/1956 | Zeilman . |
| 3,175,849 | 3/1965 | Kelly . |
| 3,225,855 * | 12/1965 | Sherwen . |
| 3,605,931 | 9/1971 | Firth et al. . |
| 3,612,204 | 10/1971 | Allen . |
| 3,659,869 * | 5/1972 | Hase et al. ............................ 280/96.1 |
| 4,043,567 * | 8/1977 | Kaiser ................................... 280/96.1 |
| 5,080,401 | 1/1992 | Stich . |
| 5,529,347 | 6/1996 | Lee . |

* cited by examiner

Primary Examiner—Kevin Hurley
(74) Attorney, Agent, or Firm—Liniak, Berenato, Longacre & White

(57) ABSTRACT

A novel arrangement of a steering axle for a land vehicle having a hydrostatic drive system, wherein a hydraulic motor assembly is directly mounted on a steerable wheel of the axle and adapted to be movable with the wheel, is disclosed. The steering axle comprises a pair of kingpin assemblies pivotally mounting steering knuckles to axle yokes. An upper kingpin assembly pivotally attaches the steering knuckle to the axle yoke, and, at the same time, provides a hydraulic swivel coupling between the wheel mounted hydraulic motor and the rest of the hydrostatic drive system of mounted on the vehicle, that prevents the bending of the hydraulic hoses conveying hydraulic fluid, by steering movements of the front steerable wheels.

11 Claims, 6 Drawing Sheets

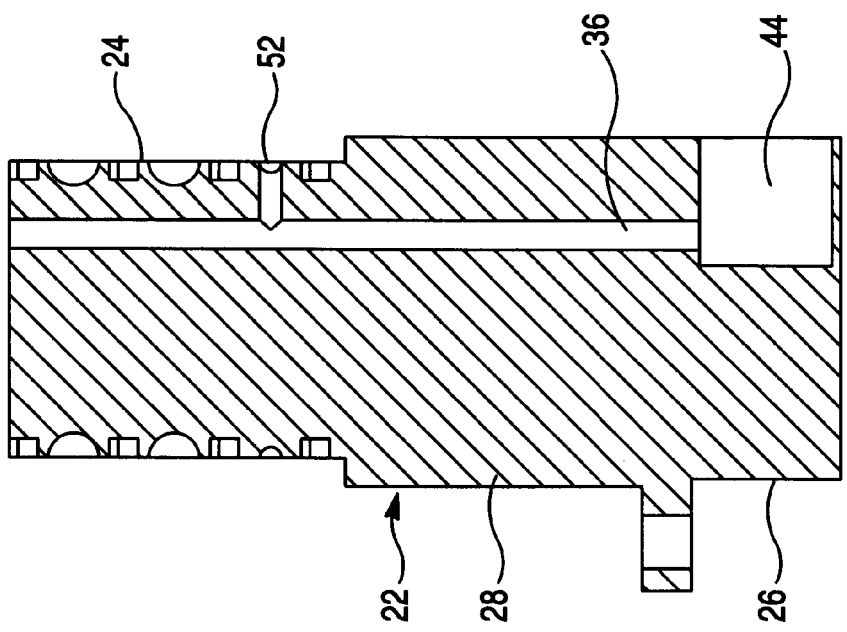
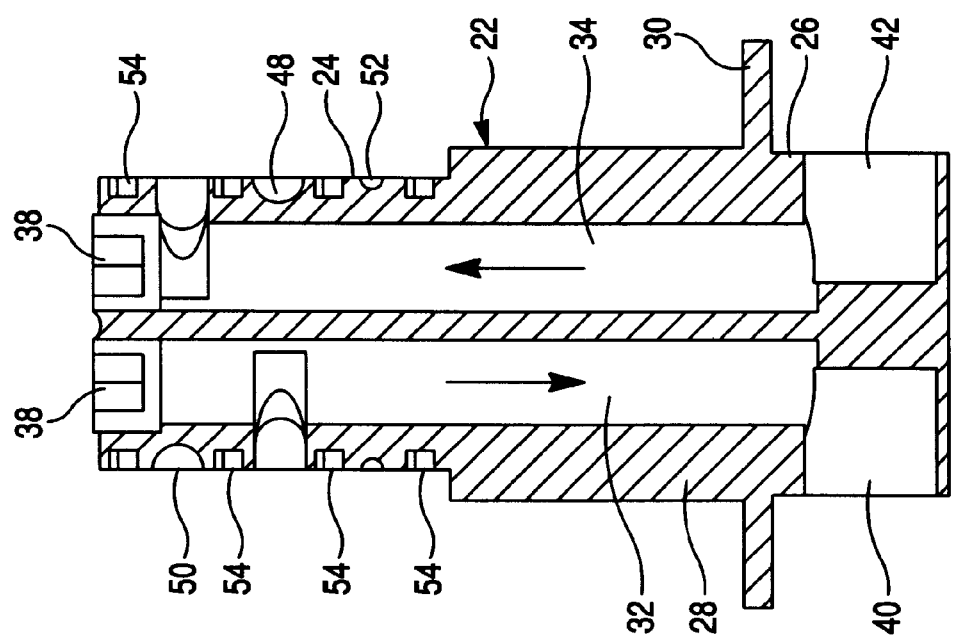
Fig. 4B
Fig. 4A

STEERING AXLE FOR VEHICULAR HYDRAUSTATIC DRIVE SYSTEM

BACKGROUND OF THE INVENTION

1. Field of the Invention

The present invention relates to a steering axle of a vehicle having a hydrostatic front wheel drive system, and more particularly to a kingpin incorporating a hydraulic swivel coupling adapted to provide a static hydraulic connection between a hydraulic motor mounted directly on a steerable wheel and a source of a pressurized hydraulic fluid mounted on a vehicle body.

2. Description of the Prior Art

Hydrostatic vehicle drive systems have been very popular and commonly used for many vehicles of the "off-highway" type, such as industrial and farming machines, or similar vehicles. Drive wheels of such vehicles are directly driven by fluid pressure actuated hydraulic motors, often mounted directly to the drive wheels, both steerable and nonsteerable. Correspondingly, the vehicles are provided with one or more sources of pressurized hydraulic fluid mounted on a vehicle body, usually in the form of hydraulic pump(s). The vehicular hydrostatic drive system is a highly complex assembly of one or more hydraulic pumps and various valves assemblies interconnected by hydraulic fluid lines. A substantial number of vehicles having the hydrostatic transmission system are provided with a front axle (seldom with a rear axle) having both steering and driving capabilities, wherein a hydraulic motor is mounted directly to the front wheels. A series of hydraulic hoses interconnect the wheel mounted hydraulic motors to the vehicle body mounted hydraulic pump. Naturally, in operation, the hoses experience numerous cycles of bending since the position of the steerable wheels and correspondingly the wheel mounted hydraulic motors change repeatedly. It is a common problem in such a system that the flexible hydraulic hoses used to supply fluid to or from the wheel motor, tend to become rigid under the influence of the pressurized hydraulic fluid, interfere with the steering and, eventually, develop a fatigue that over the period of time could lead to a damage to the hoses.

SUMMARY OF THE INVENTION

The present invention provides a hydraulic swivel coupling assembly for a steering drive axle of a vehicle having a hydrostatic drive system, wherein a hydraulic motor assembly is directly mounted on a steerable wheel of the axle and adapted to be movable with the wheel.

The steering drive axle of the present invention comprises a pair of kingpin assemblies pivotally mounting steering knuckles to axle yokes. An upper kingpin assembly pivotally attaches the steering knuckle to the axle yoke, and, at the same time, provides a hydraulic swivel coupling between the wheel mounted hydraulic motor and the rest of the hydrostatic drive system of mounted on the vehicle, that prevents the bending of the hydraulic hoses conveying hydraulic fluid, by steering movements of the front steerable wheels.

In accordance with the preferred embodiment of the present invention, the upper kingpin assembly comprises a kingpin fixedly secured to a knuckle arm, and a block manifold pivotally coupled to the kingpin and secured to the axle yoke arm. The kingpin includes a set of axial spaced hydraulic fluid passages adapted to communicate with the complimentary set of hydraulic fluid passages formed in the block manifold, at any angular position of the kingpin.

Therefore, the novel arrangement of the steering drive axle of the present invention prevents fatiguing and damage of the hydraulic hoses, thus substantially improving the reliability of the vehicular hydrostatic transmission. Moreover, it allows the use of less expensive hard tubes instead of the flexible hoses, thus reducing the manufacturing cost of the vehicle.

BRIEF DESCRIPTION OF THE DRAWINGS

Other objects and advantages of the invention will become apparent from a study of the following specification when viewed in light of the accompanying drawings, wherein:

FIG. 3b is a sectional view of the upper kingpin assembly taken on line B—B of FIG. 3a;

FIG. 4a is a sectional view of a kingpin as shown in FIG. 3a;

FIG. 4b is a sectional view of the kingpin as shown in FIG. 3b;

FIG. 5a is a sectional view of a block manifold as shown in FIG. 3a;

DETAILED DESCRIPTION OF PREFERRED EMBODIMENTS

The preferred embodiment of the present invention will now be described with the reference to accompanying drawings.

Figure 1:
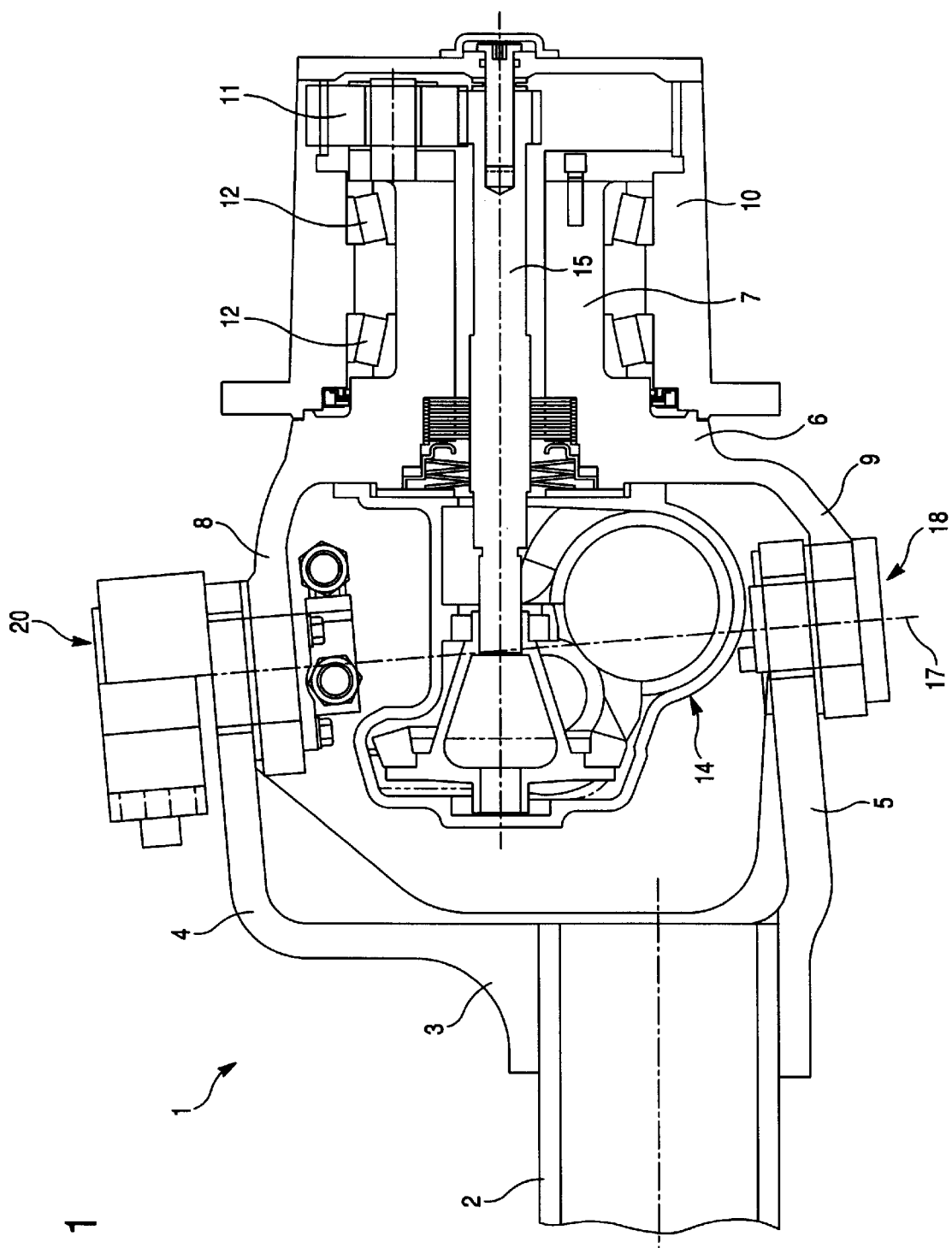
FIG. 1 is a partial sectional view of one end of a front steering axle of a vehicle having a hydrostatic transmission system in accordance with the present invention.

FIG. 1 of the drawings illustrates a novel arrangement of a steering axle 1 of a vehicle (not shown) equipped with a hydrostatic drive system. The steering axle of the present invention includes a rigid girder 2 provided with a pair of axle yokes 3 integrally secured at the opposite ends thereof, such as by welding. Each of said axle yokes has two bifurcated arms: an upper arm 4 and a lower arm 5. Each axle yoke 3 is pivotally connected to a corresponding wheel knuckle 6. Ordinarily, the knuckle 6 comprises a spindle 7 formed integrally with an upper knuckle arm 8 and a lower knuckle arm 9. The spindle 7 is adapted to rotatably support a wheel hub 10 via a pair of roller bearings 12. Mounted to the knuckle 6 is a hydraulic drive motor assembly 14 adapted to drive a steerable wheel (not shown) through a drive shaft 15 and a planetary gearing 16. Typically, such drive motors are either of the axial piston type, or of the radial piston type, or of the gerotor type, although those of ordinary skill in the art will understand that any other appropriate types of the hydraulic drive motor may be employed in the present invention.

The hydraulic motor assembly 14 is fluidly connected to a source of pressurized hydraulic fluid, usually a single hydraulic pump assembly, mounted on a body of the vehicle (not shown) through three types of hydraulic fluid lines: pressure, return and drain lines.

The axle yoke 3 and the knuckle 6 are pivotally connected by means of a lower kingpin assembly 18 and an upper kingpin assembly 20. The lower kingpin assembly 18 and the upper kingpin assembly 20 are arranged coaxially with respect to each other and are adapted to pivot about a steering axis 17.

The lower kingpin assembly 18 pivotally couples the lower arm 5 of the girder yoke 3 and the lower knuckle arm 9. It has an ordinary construction well known in the prior art and is not a significant feature of the present invention.

The upper kingpin assembly 20 in the steering axle 1 of the present invention, not only pivotally couples the upper arm 4 of the girder yoke 3 and the upper arm 8 of the knuckle 6, but also functions as an integral hydraulic swivel coupling.

Figure 2:
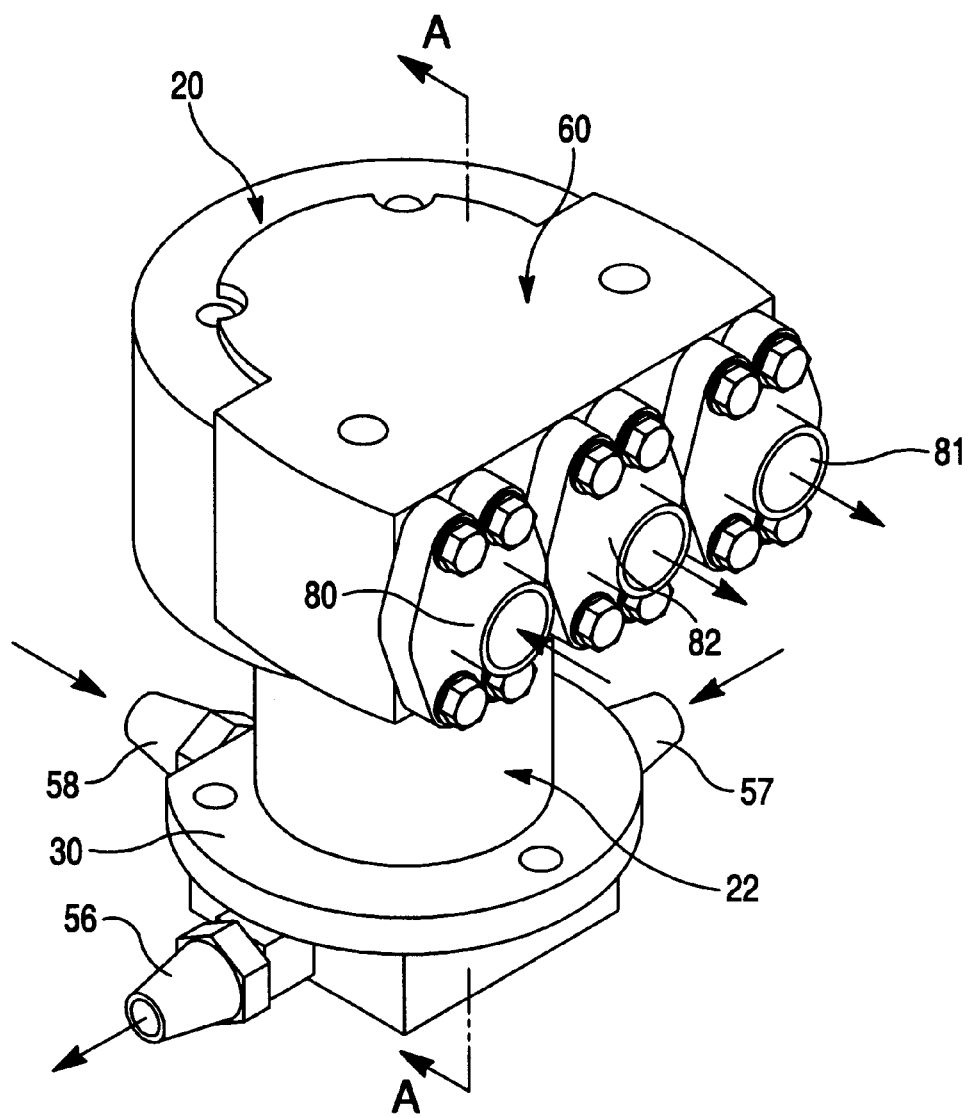
FIG. 2 is a perspective view of an upper kingpin assembly in accordance with the preferred embodiment of the present invention.

In accordance with a preferred embodiment of the present invention illustrated in FIG. 2, the upper kingpin assembly 20 comprises a kingpin 22 fixedly secured to the upper knuckle arm 8, and a block manifold 60 pivotally coupled to the kingpin 22 and fixedly secured to the upper arm 4 of the girder yoke 3. The kingpin 22 is provided with a set of fittings: a pressure hose fitting 56, a return hose fitting 57 and drain hose fitting 58 adapted to secure to the kingpin 22 the pressure, return and drain hoses respectively (not shown), coming from the hydraulic drive motor assembly 14. Likewise, the block manifold 60 is provided with a similar set of fittings: a pressure hose fitting 80, a return hose fitting 81 and drain hose fitting 82 adapted to secure to the block manifold 60 the pressure, return and drain hoses respectively (not shown), coming from the hydraulic pump assembly (not shown).

The kingpin 22, illustrated in detail in FIGS. 4a and 4b, includes a an elongated body formed with a generally cylindrical first end portion 24, a generally rectangular second end portion 26 and a generally cylindrical shank portion 28 interconnecting the first and second end portions 24 and 26, respectively. The second end portion 26 of the kingpin 22 is provided with a flange 30 adapted for connection to the upper knuckle arm 8 by any appropriate means well known in the art, preferably by threaded fasteners such as bolts, as shown in FIG. 1.

The body of the kingpin 22 is provided with three separate internal hydraulic flow passages: a pressure passage 32, a return passage 34 and a drain passage 36. Preferably, the passages 32, 34 and 36 are drilled axially down the kingpin body from an end face adjacent to the first end 24. Upper ends of the pressure and return passages 32 and 34 respectively, are sealed by plugs 38.

Figure 3A:
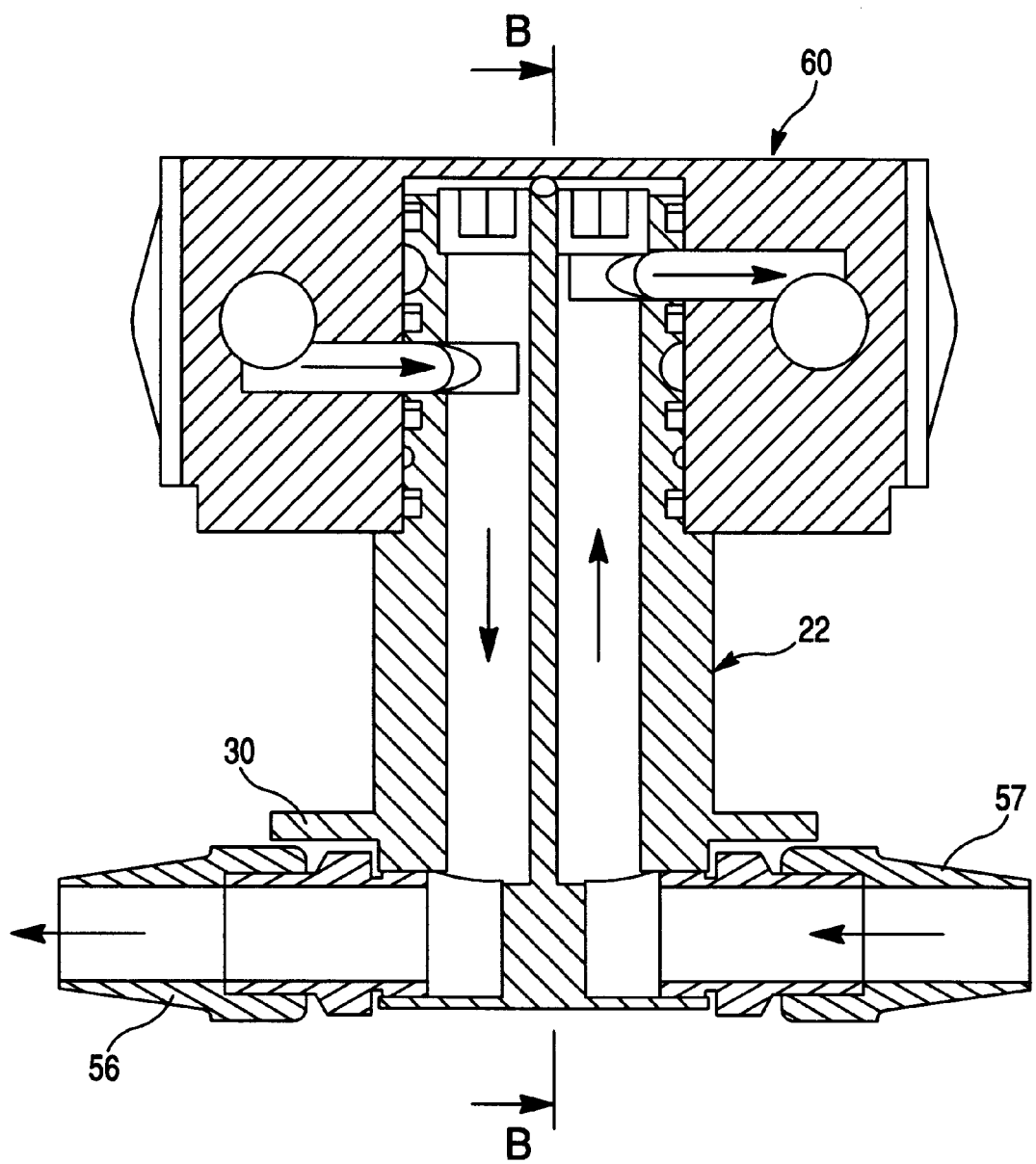
FIG. 3a is a sectional view of the upper kingpin assembly taken on line A—A of FIG. 2.
Figure 3B:
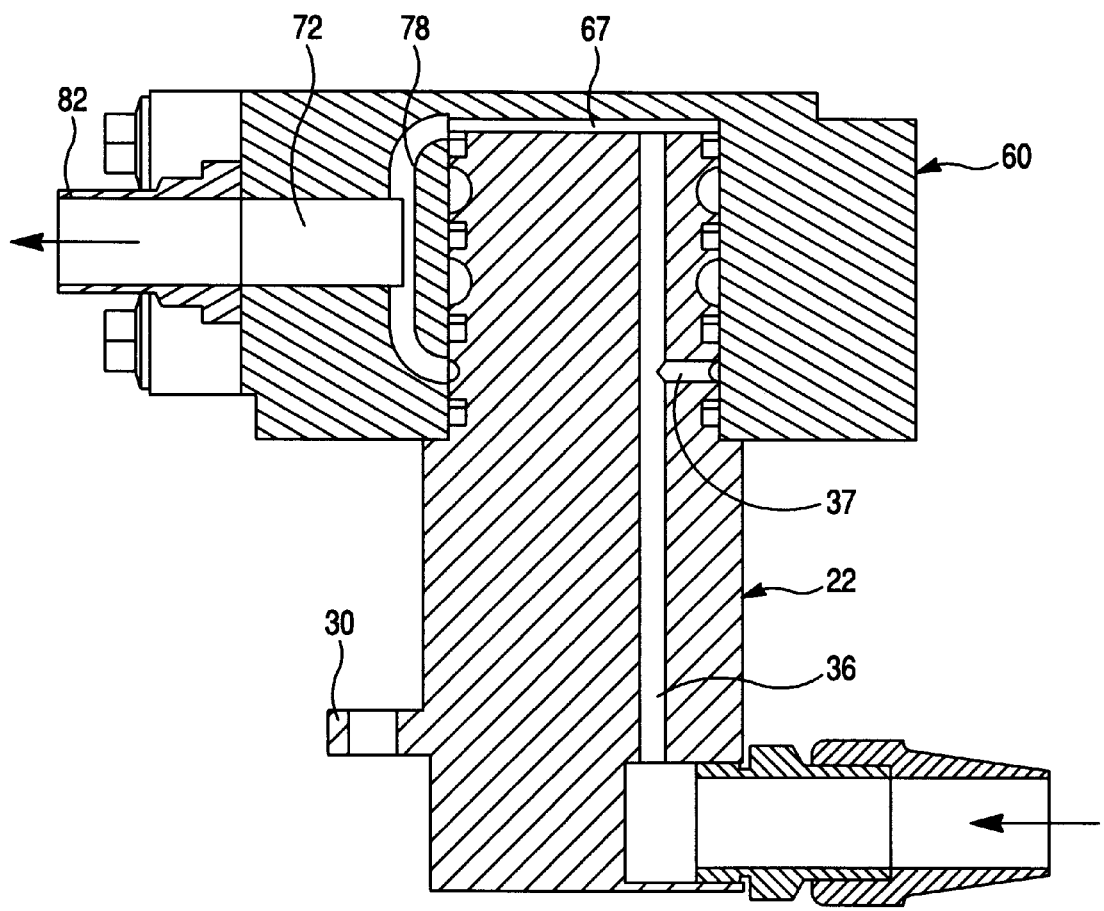

The second end portion 26 of the kingpin 22 is provided with a pressure port 40, a return port 42 and a drain port 44 communicating with the pressure, return and drain ports respectively. As illustrated in FIGS. 2, 3a and 3b, each of the ports 40, 42 and 44 is provided with the corresponding hydraulic hose fittings 56, 57 and 58 connecting the ports 40, 42 and 44 to the corresponding hydraulic fluid hoses of the hydraulic drive motor assembly 14.

Furthermore, the first end portion 24 of the kingpin 22 is provided with three axially spaced annular channels: a pressure channel 48, a return channel 50 and a drain channel 52. Preferably, the channels 48, 50 and 52 are formed on an outer peripheral surface of the first end portion 24, and are semicircular in a cross-section. Each of the channels 48, 50 and 52 is in fluid communication with the corresponding hydraulic fluid passage: the pressure channel 48 with the pressure passage 32, the return channel 50 with the return passage 34 and the drain channel 52 with the drain passage 36 through a radial passage 37.

Each of the annular channels 48, 50 and 52 of the first end portion 24 of the kingpin 22 is included between axially spaced grooves each receiving C-rings 54 sealingly engaging the inner peripheral surface 66 of the block manifold 60 and axially fluidly sealing (or separating) the channels from each other and ambient air. It will be appreciated that any other means to contain the hydraulic fluid to their respective ports, is within the scope of the present invention.

Figure 5A:
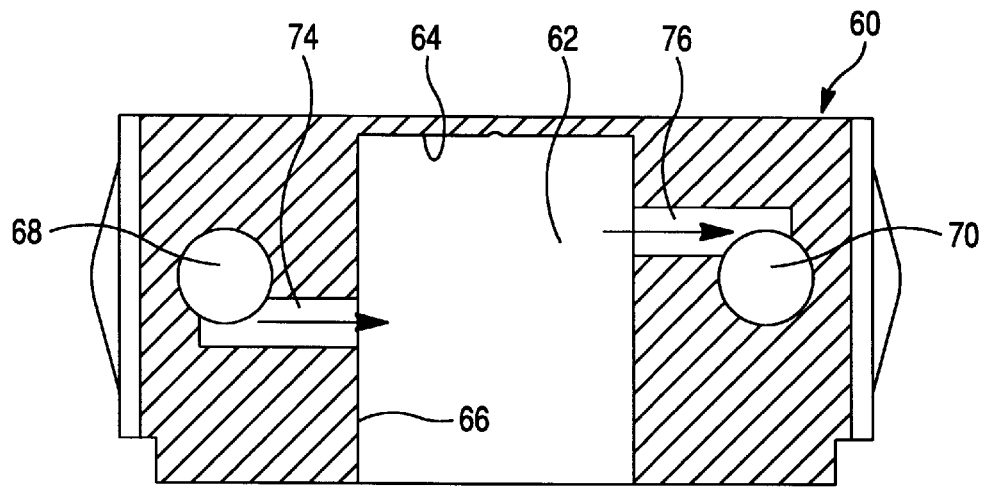
Figure 5B:
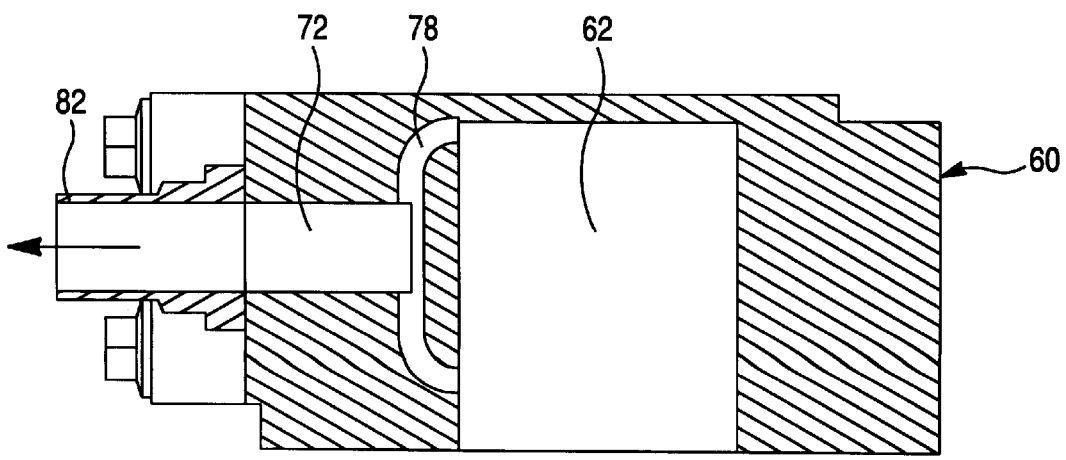
FIG. 5b is a sectional view of the block manifold as shown in FIG. 3b.

As illustrated in FIGS. 3a and 3b, rotatably mounted on the outer peripheral surface of the first end portion 24 of the kingpin 22 coaxially with the axis 17 is the block manifold 60. The block manifold 60, illustrated in detail in FIGS. 5a and 5b, is provided with a substantially cylindrical cavity 62 formed by a bottom surface 64 and a substantially cylindrical inner peripheral surface 66. The cavity 62 is adapted to receive the first end portion 24 of the kingpin 22 so that a drain fluid chamber 67 is formed between the end face of the kingpin 22 adjacent to the first end portion 24 and the bottom surface 64 of the cavity 62. Extending from the inner peripheral surface 66 are two spaced, substantially radial manifold passages. A pressure manifold passage 74 is arranged to register with the pressure channel 48 at one end and communicates with a block manifold pressure port 68 at the other end. Similarly, a return manifold passage 76 is arranged to register with the pressure channel 50 at one end and communicates with a block manifold return port 70 at the other end. A separate U-shaped drain manifold passage 78 interconnects the drain channel 52 with the drain fluid chamber 67 and communicates with a block manifold drain port 72. Each of the manifold ports 68, 70 and 72 is provided with the corresponding hydraulic hose fittings 80, 81 and 82 connecting the ports 68, 72 and 72 to the corresponding hydraulic fluid hoses of the hydraulic pump assembly.

Alternatively, three axially spaced annular channels: the pressure channel 48, the return channel 50 and the drain channel 52, may be formed on the inner peripheral surface 66 of the block manifold 60. In this case, the axial fluid passages 32, 34 and 36 formed in the kingpin 22, are provided with respective communication ports at the first end portion 24 of the kingpin 22 arranged to register with the corresponding annular channels 48, 50 and 52 formed on the inner peripheral surface 66 of the block manifold 60.

As explained above, in the steering axle arrangement of the present invention described hereinabove, the hydraulic pump assembly and the hydraulic motor assembly 14 fluidly communicate through the upper kingpin assembly 20 providing a hydraulic swivel coupling. The upper kingpin assembly 20 is connected to the hydraulic pump assembly and the hydraulic motor assemblies 14 through pressure, return and drain hydraulic fluid hoses. It will be appreciated that the kingpin assembly 20 of the present invention allows the steering knuckle 6 to freely swivel relative to the girder yoke 3 in response to steering force applied to the steering knuckle 6, and, at the same time, provides a reliable hydraulic connection between the hydraulic motor 14 and the rest of the hydrostatic drive system mounted on the vehicle at any operating steering angle of the steerable driving wheels of the hydrostatic drive system without interfering with the steering movements of the wheels.

Therefore, the hydraulic swivel coupling of the present assembly represents a novel arrangement of the kingpin assembly 20 for the steering drive axle of the hydrostatic drive system and provides a static plumbing connection between the hydraulic motor 14 and the rest of the hydrostatic drive system mounted on the vehicle that prevents fatiguing and damage of the hydraulic hoses and allows using less expensive hard tubes instead of the flexible hoses.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A steering axle in a vehicle having a hydrostatic drive system wherein a hydraulic motor assembly is mounted on a steerable wheel of said axle and adapted to be movable with the wheel, said axle comprising:

a girder provided with a pair of axle yokes at the opposite ends thereof;

a pair of steering knuckles pivotally mounted to said axle yokes at the opposite ends of said girder by means of at least one kingpin assembly aligned with a steering axis of the wheel;

said kingpin assembly including a kingpin and a block manifold slidingly engaging said kingpin;

said kingpin having a substantially cylindrical first end portion, a second end portion and a substantially cylindrical shank portion disposed therebetween;

said shank portion being rotatably coupled to said axle yoke and fixed to one of said steering knuckles;

said block manifold rotatably coupled to said first end portion of said kingpin and secured to said axle yoke;

said kingpin having a pressure, return and drain fluid passages formed therein and extending from said first end portion to said second end portion through said shank portion;

a pressure, return and drain axially spaced annular channels provided around said first end portion of said kingpin, wherein said pressure channel being registered with said pressure fluid passage, said return channel being registered with said return fluid passage, and said drain channel being registered with said drain fluid passage;

a plurality of sealing rings adapted for axially separating and sealing said annular channels;

said block manifold having a pressure, return and drain axially spaced substantially radially extending manifold passages, wherein said pressure, return and drain manifold passages being in fluid communication with said pressure, return and drain annular channels respectively at one end and being provided with a pressure, return and drain manifold communication ports at the other end; said ports being connected to corresponding fluid lines of a source of pressurized hydraulic fluid mounted on a body of the vehicle;

said second end portion of said kingpin having pressure, return and drain fluid ports, each of said ports communicating with said corresponding pressure, return and drain fluid passages, said ports being fluidly connected to corresponding fluid lines of said hydraulic motor assembly.

2. The steering axle as defined in claim 1, wherein said shank portion of said kingpin includes a flange adapted to be fastened to said knuckle.

3. The steering axle as defined in claim 1, wherein said pressure, return and drain channels being formed on an outer peripheral surface of said first end portion of said kingpin.

4. The steering axle as defined in claim 1, wherein said block manifold having a substantially cylindrical socket receiving said first end of said kingpin; said socket having an open end, a bottom surface and a substantially cylindrical inner peripheral surface.

5. The steering axle as defined in claim 4, wherein said pressure, return and drain axially spaced annular channels are formed on said inner peripheral surface of said block manifold.

6. The steering axle as defined in claim 1, further including a drain fluid chamber formed between said first end portion of said kingpin and said bottom surface of said socket of said block manifold, wherein said drain manifold passage fluidly interconnecting said drain fluid chamber and said drain annular channel to said drain manifold passage.

7. A kingpin assembly in a steering axle of a vehicle having a hydrostatic drive system wherein a hydraulic motor assembly is mounted on a steerable wheel of said axle and adapted to be movable with the wheel, said kingpin assembly comprising:

a kingpin and a block manifold slidingly engaging said kingpin;

said kingpin having a substantially cylindrical shank portion provided with a substantially cylindrical first end portion and a second end portion at the opposite ends thereof;

said shank portion being rotatably coupled to an axle yoke and fixed to a steering knuckle;

said kingpin having a plurality of spaced fluid passages formed therein and extending axially and radially from said first end portion to said second end portion through said shank portion;

a plurality of axially spaced annular channels provided around said first end portion of said kingpin, each of said annular channels being in fluid communication with one of said fluid passages;

a plurality of sealing rings adapted for axially separating and sealing said annular channels;

said block manifold pivotally coupled to said first end portion of said kingpin and secured to said axle yoke;

said block manifold having a plurality of axially spaced substantially radially extending manifold passages;

each of said manifold passages being registered with one of said annular channels at one end and provided with a plurality of manifold communication ports at the other end, said ports being connected to corresponding fluid lines of a source of pressurized hydraulic fluid mounted on a body of the vehicle;

said second end portion of said kingpin having a plurality of fluid ports, each of said ports communicating with one of said fluid passages formed in said kingpin, said ports being fluidly connected to corresponding fluid lines of said hydraulic motor assembly.

8. The kingpin assembly as defined in claim 7, wherein said second end portion of said kingpin includes a flange adapted to be fastened to said steering knuckle.

9. The kingpin assembly as defined in claim 7, wherein said plurality of axially spaced annular channels is formed on an outer peripheral surface of said first end portion of said kingpin.

10. The kingpin assembly as defined in claim 7, wherein said block manifold having a substantially cylindrical socket receiving said first end portion of said kingpin; said socket having an open end, a bottom surface and a substantially cylindrical inner peripheral surface.

11. The kingpin assembly as defined in claim 10, wherein said plurality of axially spaced annular channels being formed on said inner peripheral surface of said block manifold.

* * * * *

UNITED STATES PATENT AND TRADEMARK OFFICE
CERTIFICATE OF CORRECTION

PATENT NO. : 6,302,233 B1
DATED : October 16, 2001
INVENTOR(S) : Okamuro et al.

It is certified that error appears in the above-identified patent and that said Letters Patent is hereby corrected as shown below:

<u>Title page,</u>
Item [73], should read as follows: -- [73] Assignee: Spicer Technologies, Inc., Fort Wayne, IN (US), Dana Corporation, Toledo, OH (US) --

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,302,233 B1
DATED         : October 16, 2001
INVENTOR(S)   : Okamuro et al.

It is certified that error appears in the above-identified patent and that said Letters Patent is hereby corrected as shown below:

<u>Title page,</u>
Item [73], Assignee, delete "Spicer Technologies, Inc., Fort Wayne, IN (US)" and insert -- Dana Corporation, Toledo, OH (US) --.

This certificate supersedes Certificate of Correction issued October 22, 2002.

Signed and Sealed this

Seventeenth Day of December, 2002

JAMES E. ROGAN
*Director of the United States Patent and Trademark Office*